July 28, 1936.  W. A. SMITH, SR., ET AL  2,048,957
VALVE FOR ROCK DRILLS
Filed May 29, 1935  3 Sheets-Sheet 1
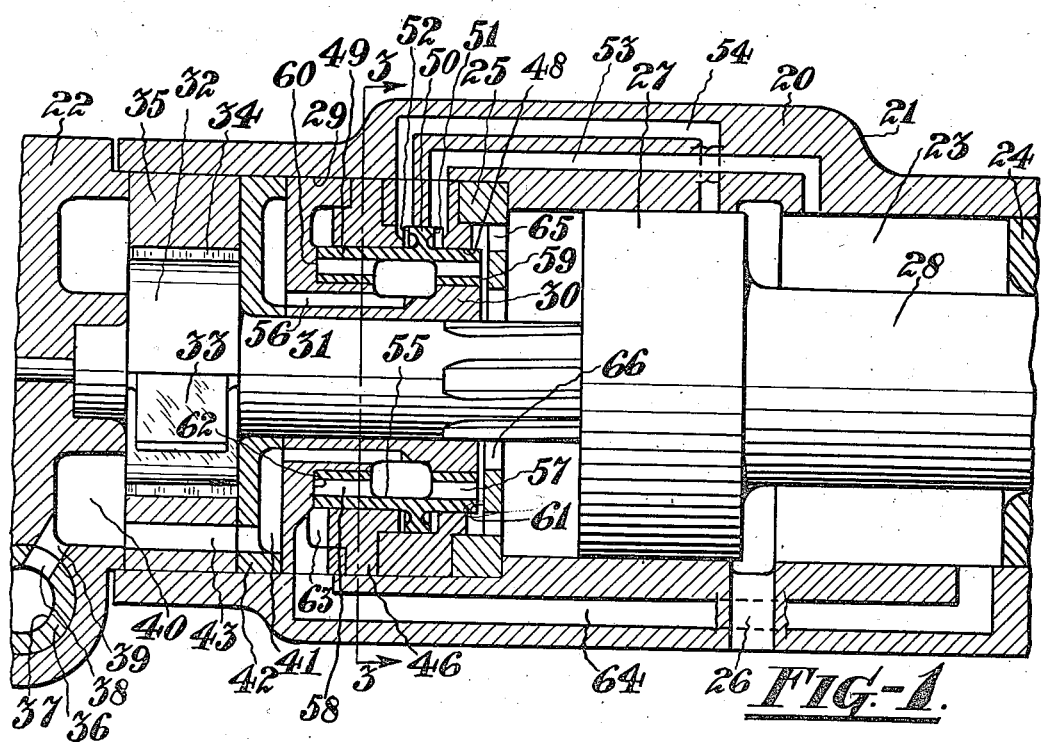
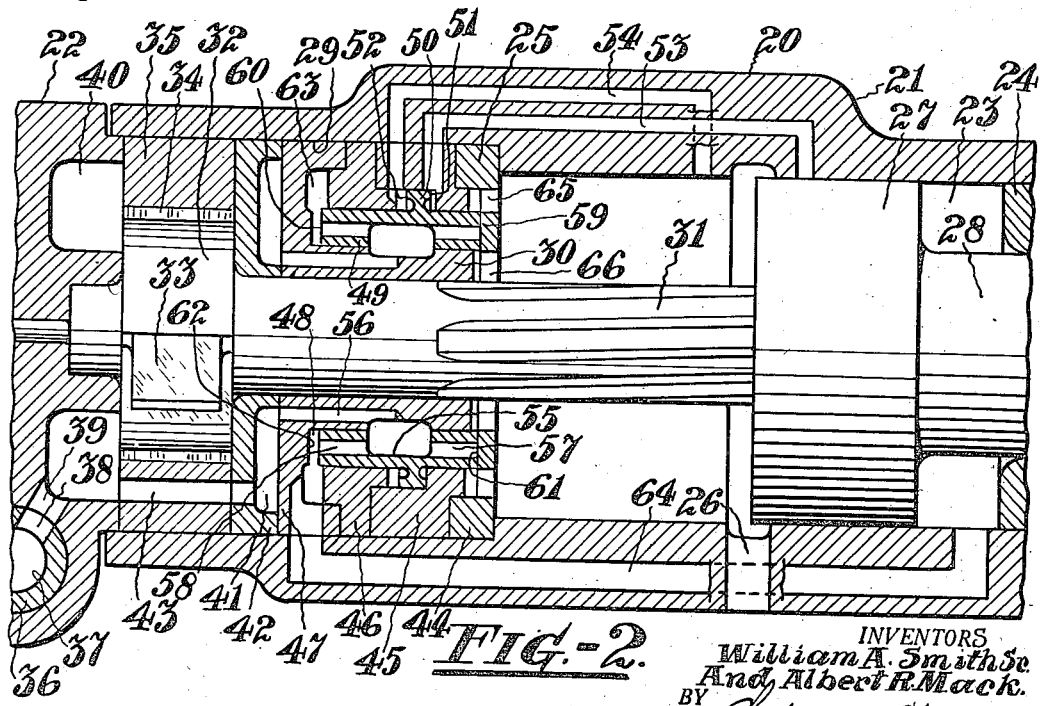
INVENTORS
William A. Smith Sr.
And Albert R. Mack.
BY
THEIR ATTORNEY.

July 28, 1936.  W. A. SMITH, SR., ET AL  2,048,957
VALVE FOR ROCK DRILLS
Filed May 29, 1935  3 Sheets-Sheet 2

INVENTORS
William A. Smith Sr.
And Albert R. Mack
BY
THEIR ATTORNEY.

July 28, 1936.  W. A. SMITH, SR., ET AL  2,048,957
VALVE FOR ROCK DRILLS
Filed May 29, 1935  3 Sheets-Sheet 3

INVENTORS
William A. Smith Sr.
And Albert R. Mack.
BY
THEIR ATTORNEY.

Patented July 28, 1936

2,048,957

UNITED STATES PATENT OFFICE 2,048,957

VALVE FOR ROCK DRILLS

William A. Smith, Sr., Athens, and Albert R. Mack, Easton, Pa., assignors to Ingersoll-Rand Company, Jersey City, N. J., a corporation of New Jersey Application May 29, 1935, Serial No. 24,046

23 Claims. (Cl. 121—28)

This invention relates to rock drills, and more particularly to a distributing valve for a fluid actuated rock drill of the reciprocatory piston type.

One object of the invention is to obtain a light weight valve capable of effecting a rapid distribution of the pressure fluid to the ends of the piston chamber.

Another object of the invention is to assure a heavy charge of pressure fluid to the piston chamber with a minimum lift of the valve.

Other objects will be in part obvious and in part pointed out hereinafter.

Figure 4:
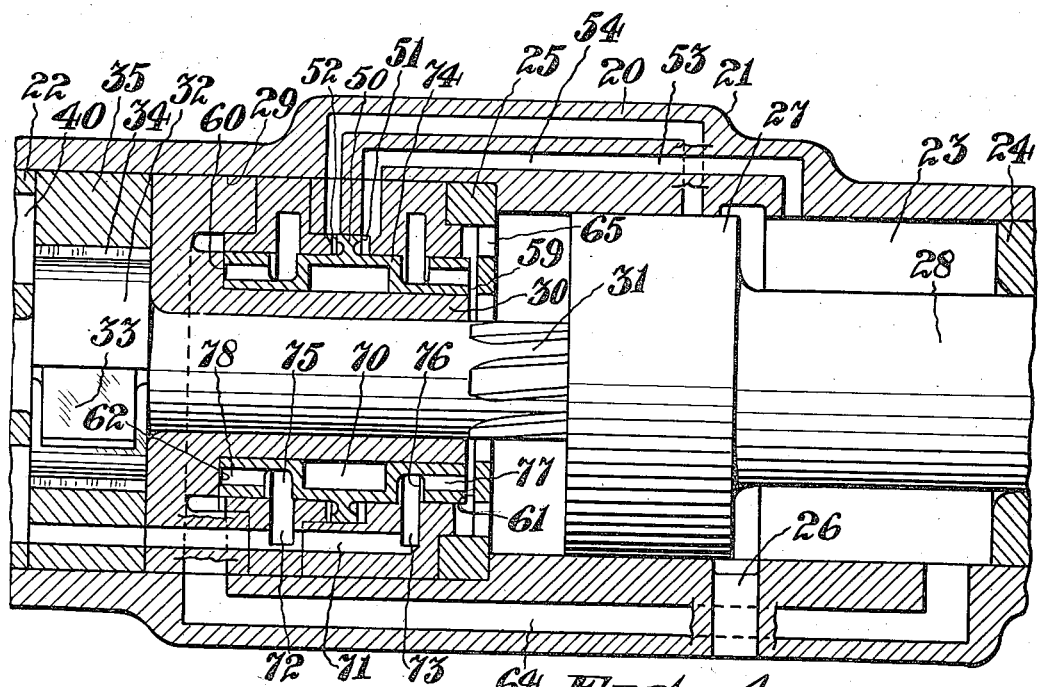
Figure 3:
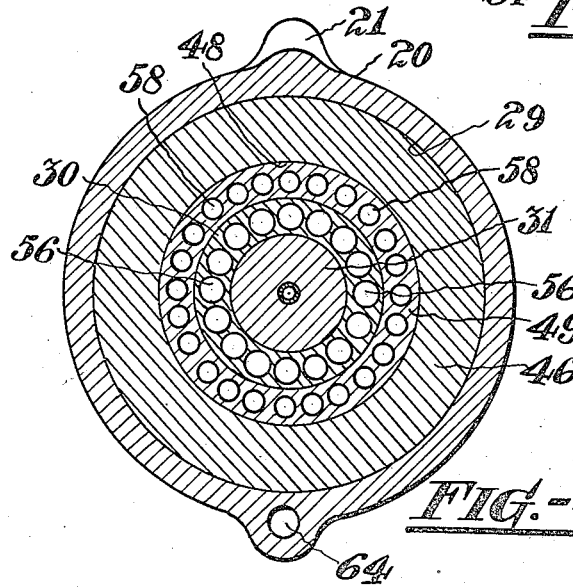
Figure 5:
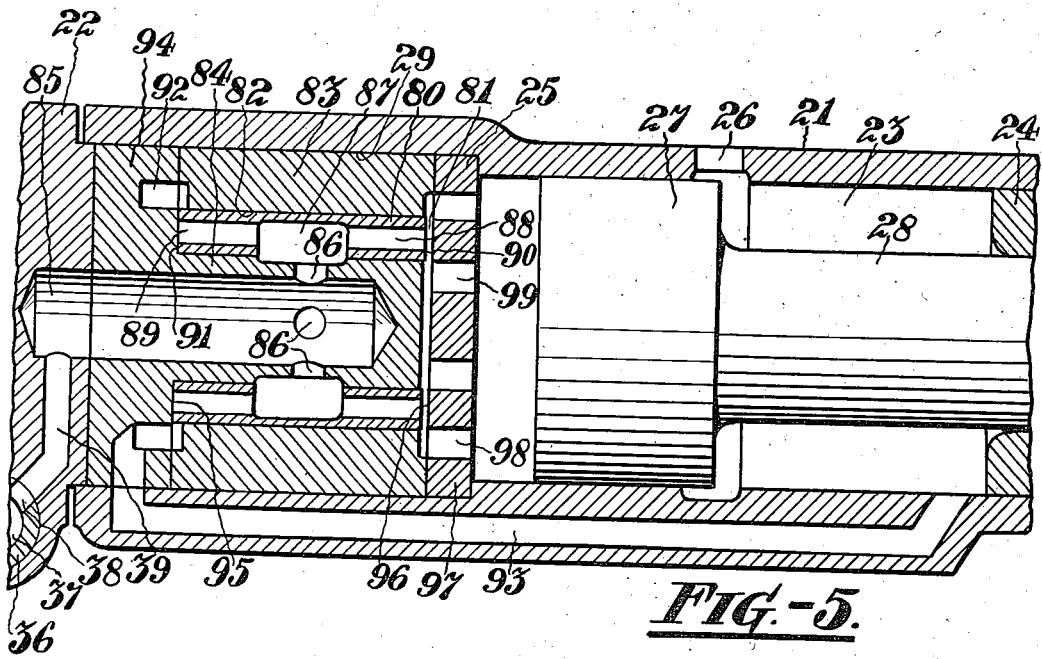
Figure 6:
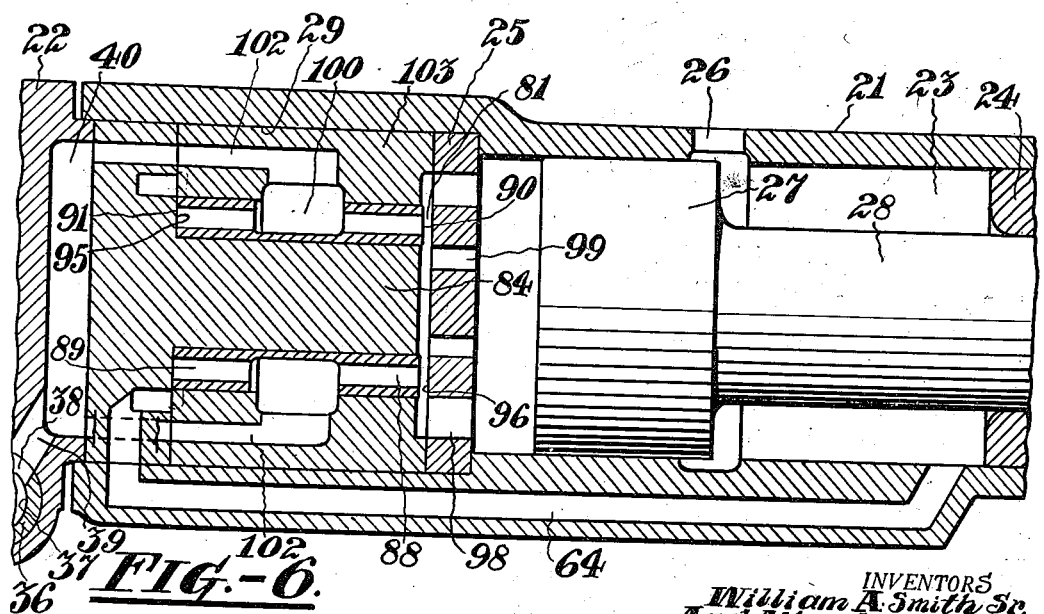

In the drawings accompanying this specification and in which similar reference characters refer to similar parts, Figures 1 and 2 are longitudinal sectional elevations of a rock drill equipped with valve mechanism constructed in accordance with the practice of the invention and showing the valve in positions for admitting pressure fluid into the rear and front ends, respectively, of the piston chamber, Figure 3 is a transverse view taken through Figure 1 on the line 3—3, and Figures 4, 5, and 6 are views similar to Figures 1 and 2 showing further modified forms which the invention may assume in practice.

Referring more particularly to the drawings, and at first to Figures 1 and 2, 20 designates a rock drill comprising a cylinder 21 and a back head 22 which constitute, among other elements, (not shown) the casing of the rock drill and may be secured together in any suitable manner.

The cylinder 21 is bored to provide a piston chamber 23 having a closure at its front end in the form of a front cylinder washer 24, and the rear end of the piston chamber 23 is closed, in this instance, by valve mechanism designated in its entirety by 25. The piston chamber 23 has a free exhaust port 26 and contains a reciprocatory hammer piston 27 which controls the exhaust port 26 and has a front reduced extension 28 extending slidably through the front cylinder washer 24.

The valve mechanism 25 is arranged in an enlarged bore 29 in the rear end of the cylinder 21 and includes as an element a bushing 30 which serves as a bearing for a rifle bar 31 wherewith the piston 27 is slidably interlocked. The rifle bar 31 has the usual head 32 which carries pawls 33 adapted to engage the teeth 34 of a ratchet ring 35 for determining the direction of rotation of the rifle bar and thus of the piston 27.

The back head 22 is seated upon the ratchet ring 35 and contains a throttle valve 36 of the rotary type whereby the admission of pressure fluid into the rock drill is controlled. The throttle valve 36 has a central aperture 37 which may be in constant communication with a source of pressure fluid supply, and in the wall of the throttle valve is a port 38 to register with a passage 39 leading to a chamber 40 in the front end of the front head 22.

Within the rock drill is a second chamber 41 which is located in the front end of a plate 42 interposed between the valve mechanism 25 and the ratchet ring 35 to form a seat for the latter. The chambers 40 and 41 are connected by a passage 43 for conveying pressure fluid to the chamber 41, whence it may pass to the valve mechanism 25.

The valve mechanism 25, constructed in accordance with the practice of the invention, comprises a series of plates 44, 45, 46, and 47. The plate 44 constitutes a bounding surface for the rear end of the piston chamber 23 and the plate 47 is in the form of a flange on the rear end of and integral with the bushing 30. The plates 45 and 46 are interposed between the plates 44 and 47, and the various plates are so formed as to enable adjacent plates to be in telescopic engagement with each other.

The plates 45 and 46 which constitute the intermediate portion of the valve chest are suitably bored and the inner surfaces thereof cooperate with the peripheral surface of the bushing 30 to define a valve chamber 48 of substantially annular shape to accommodate a valve 49 whereby the pressure fluid is distributed to the ends of the piston chamber 23. Thus, as will be seen, the valve 49 is of annular shape. It is guided by the bushing 30 and the plates 45 and 46 and on its periphery and at a point intermediate its ends is a flange 50 of which the front and rear surfaces constitute actuating surfaces 51 and 52, respectively, to which pressure fluid is conveyed by kicker passages 53 and 54.

The kicker passages open into the piston chamber preferably at points closely adjacent the exhaust port 26. The passages 53 and 54 are so arranged that the passage 53 communicates the front end of the piston chamber 23 with the actuating surface 51 and the passage 54 affords communication between the rearward portion of the piston chamber and the actuating surface 52.

Intermediate the ends of the valve 49 and in its inner surface is a supply chamber 55 into which pressure fluid is introduced by passages 56 in the bushing 30 and leading from the chamber 41. In the portions of the valve lying forwardly and rearwardly of the chamber 55 are passages 57 and 58, respectively, which lie entirely within the wall of the valve and through which the pressure fluid passes for charging the ends of the piston chamber. The passages 57 and 58 are of considerable length as compared with their diameters and, in effect, constitute nozzles presenting large areas of surface which are subjected to the frictional force or suction of the pressure fluid flowing therethrough for throwing the valve.

The passages 57 and 58 are arranged in circular rows. They may be of any suitable number, diameter and length, depending upon the required total flow area for supplying the piston chamber with pressure fluid as well as upon the area of surface necessary to assure a suction force requisite to effect a prompt unseating and a speedy actuation of the valve to its limiting positions.

The passages 57 and 58 have their outlet openings in the ends of the valve so that during its course to the piston chamber the pressure fluid flows across the ends of the valve. In consequence, the front and rear ends of the valve 49 serve as holding surfaces 59 and 60, respectively, of which that designated 59 is the active holding surface in the position of the valve shown in Figure 1, and the surface 60 is exposed to the pressure fluid flowing from the passages 58 for holding the valve in the foremost limiting position illustrated in Figure 2.

In the plane of the passages 57 and 58 and on the plates 44 and 47, respectively, are seating surfaces 61 and 62 which serve as stop members for the valve 49 and also to seal the outlet ends of the passages 57 and 58. The seating surfaces 61 and 62 are preferably coextensive with the end areas of the valve 49, and encircling the seating surface 62 is an annular groove 63 which is defined by the plates 47 and 46 and communicates with the front end of the piston chamber through a front inlet passage 64.

As will be readily understood, in structures of the character to which the present invention pertains and in which a valve of the annular or sleeve type is disposed about the rifle bar and is provided with the various surfaces essential to its positive actuation the valve is necessarily of large diameter and usually of considerable weight. Although most of these factors may be present in the instant structure the weight of the valve has been greatly minimized by forming the passages 57 and 58 and the supply chamber 55 within the valve, and this advantageous feature has been possible without sacrificing any of the advantages of large guiding and sealing surfaces.

It is contemplated, however, to protect the valve against needless wear such as results from the battering which rock drill valves generally receive as a consequence of the speedy and forceful movement necessary to effect a rapid distribution of pressure fluid to the opposing surfaces of the piston 27. The valve is accordingly operated at low lift which, according to the invention, may be effected without, in any way, restricting the flow of pressure fluid into the piston chamber 23 to actuate the piston 27 on its working stroke. This may be accomplished by providing a plurality of concentrically arranged paths through which pressure fluid may enter the rear end of the piston chamber 23. For example, this may be accomplished by forming a group of inlet passages 65 in the plate 44 in a plane lying outside of the plane of the passages 57 and arranged in circular fashion so that, when the front end of the valve is unseated, pressure fluid flows outwardly over the edge of the valve and directly through the passages 65 into the piston chamber.

Additional passages, or as illustrated a central bore, 66, may be formed in the plate 44, and the bore may be so located and proportioned that its bounding surface will also form the innermost bounding surface of the seating surface 61. Thus, when the valve is unseated pressure fluid will also flow across the inner edge of the valve and through the bore 66 into the piston chamber, thereby assuring a large flow area with a minimum lift of the valve.

The operation of the device is as follows: When the valve 49 occupies its rearmost limiting position illustrated in Figure 1 pressure fluid flows through the passages 57, and upon issuing from said passages the stream of pressure fluid is divided and flows through the passages 65 and the bore 66 into the piston chamber to actuate the piston on its working stroke. During its course through the passages 57, and which passages, it will be understood, are suitably formed and proportioned to assure a large total area of surface, the draft of the pressure fluid passing to the rear end of the piston chamber tends strongly to draw the valve to its foremost limiting position.

The force of suction is, however, rendered non-effective by the pressure fluid acting against the holding surface 59 during the course of the pressure fluid to the piston chamber. The force of suction of the pressure fluid and its effect on the surface of the passages 57 is, however, a strong factor and, in the absence of other forces to augment it such as pressure fluid acting against the actuating surfaces 51 and 52, would be sufficient to cause a prompt reversal of the valve 49 at the instant the exhaust port 26 is uncovered by the piston 27.

In the present structure, however, the valve is reversed immediately prior to the uncovering of the exhaust port 26 and in the following manner. When the piston uncovers the kicker passage 54 pressure fluid passes through said passage and acts against the actuating surface 52. This force, combined with the suction exerted by the pressure fluid on the surfaces of the passages 57, will actuate the valve forwardly against the seating surface 61 to cut off the further admission of pressure fluid into the rear end of the piston chamber.

Immediately after the valve is shifted the free exhaust port is uncovered by the piston. The pressure fluid employed for driving the piston forwardly and that acting against the actuating surface 52 is then exhausted to the atmosphere. This takes place at about the time the piston delivers its blows against the working implement which it is intended to actuate, the kicker passages being so located with respect to the exhaust port that the actions of the valve and the piston will be nicely timed so that the subsequent admission of pressure fluid to the front end of the piston chamber will not lower the force of the working stroke of the hammer piston 27.

With the valve in the new position, pressure fluid flows through the passages 58 into the groove 63, thence through the inlet passage 64 to the front end of the piston to return it to its initial position. During its return stroke the piston first uncovers the kicker passage 53 to admit pressure fluid to the actuating surface 51.

The force acting against the actuating surface 51, combined with that acting against the surfaces of the passages 58 will promptly shift the valve rearwardly immediately before the piston uncovers the front end of the exhaust port 26. Pressure fluid is then again introduced into the rearward end of the piston chamber to repeat the cycle of operation.

At the instant the piston uncovers the free exhaust port the pressure fluid employed for actuating the piston rearwardly and that acting against the actuating surface 51 is exhausted to the atmosphere. The piston may then again proceed, unimpeded, on its working stroke.

In the form of the invention illustrated in Figure 4, the pressure fluid passes to the valve chamber 70 through a passage 71 in the plates constituting the casing of the valve chest. Communication between the passage 71 and the valve chamber is afforded by a pair of grooves 72 and 73 suitably spaced with respect to each other and opening into the valve chamber 70 at points intermediate its ends.

More specifically, the passages 72 and 73 are located rearwardly and forwardly, respectively, of the flange 50 on the periphery of a valve 74 reciprocable in the valve chamber 70. Thus, the wall of the bushing 30 may be imperforate, and the pressure fluid flows directly from the passages 72 and 73 into supply chambers 75 and 76 in the periphery of the valve 74.

In the portions of the valve lying forwardly and rearwardly of the supply chambers 76 and 75 are passages 77 and 78, respectively, through which pressure fluid flows for actuating the piston 27. With the exception of variations in proportions, the remaining features of the valve necessary to assure its efficient operation may be, in all essential respects, like that shown in Figures 1 and 2.

The operation of the valve may likewise be identical with that previously described, that is, the force of suction acting on the surfaces of the passages 76 and 77 draws the valve in the direction of the unseated end of the valve. This force is augmented by the pressure fluid flowing through the kicker passages against the actuating surfaces of the flange 50 to effect a reversal of the valve immediately prior to the uncovering of the exhaust port 26, by the piston.

In the modified form of the invention shown in Figure 5, the valve, designated 80, is exteriorly smooth and unbroken. It is arranged in a valve chamber 81 defined by the inner surface 82 of a sleeve or valve cage 83 and the peripheral surface of a plug 84 extending through the sleeve 83 and coaxially therewith. The valve chamber 81 is, therefore, of annular shape and its intermediate portion communicates with a supply chamber 85 in the plug 84 and the back head through ports 86.

In the intermediate portion and in the inner surface of the valve 80 is a chamber 87 into which the pressure fluid flows from the ports 86. Forwardly and rearwardly of the chamber 87 and in the wall of the valve are passages 88 and 89 of considerable length as compared with diameter and arranged in circular fashion to conduct the pressure fluid from the chamber 87 to the ends of the valve chamber.

The front and rear ends of the valve constitute holding surfaces 90 and 91, respectively, against which the pressure fluid flowing to the piston chamber 23 acts for holding the valve in its limiting positions. The pressure fluid issuing from the passages 89 flows into an annular groove 92 encircling the rear end of the valve, thence passes through a front inlet passage 93 to the front end of the piston chamber.

The plug 84 has an integral flange 94 which overlies the rear ends of the valve chamber 81 and the sleeve 83. The portion of the flange 94 confronting the rear end of the valve serves as a seating surface 95 for the valve and also to seal the outlet ends of the passages 89.

A closure is provided for the front ends of the passages 88 by a surface 96 of a plate 97 interposed between the sleeve 83 and the rear end of the piston chamber 23. The surface 96 serves as a seating surface for the front end of the valve, and arranged concentrically with said surface and lying outside of its plane are ports 98 which are arranged as a circular row to convey pressure fluid from the front end of the valve chamber to the rear end of the piston chamber. In a plane lying inside of the seating surface 96 is another circular row of ports 99 to serve a similar function.

The operation of the valve shown in this form of the invention is as follows: With the valve occupying its rearmost limiting position, pressure fluid passes from the chamber 87 through the passages 88, thence as a divided stream through the ports 98 and 99 into the rear end of the piston chamber and drives the piston forwardly on its working stroke.

While flowing through the passages 88 the pressure fluid exerts a strong drag or suction on the surfaces of these passages and thus tends to move the valve forwardly. The valve is held, however, in its rearmost position by the pressure fluid acting against its front end until the instant the rear edge of the exhaust port 26 is uncovered by the piston. A drop in pressure forwardly of the valve will then result, and when the pressure in the rear end of the piston chamber and that forwardly of the holding surface 90 reaches a value below the force exerted by the pressure fluid on the surfaces of the passages 88, the latter force will shift the valve forward. The valve is moved to its new position before the exhaust port is fully uncovered. The further admission of pressure fluid into the rear end of the cylinder and a wasteful discharge thereof to the atmosphere without doing useful work is thereby prevented.

This movement of the valve takes place at about the instant the piston 27 delivers its blow against the working implement. The piston will, therefore, be immediately reversed and directed towards its initial position. Whenever, during this movement of the piston, the front edge or surface of the piston uncovers the exhaust port 26 the pressure of the fluid acting against the holding surface 91 on the valve will immediately drop and the suction exerted by the pressure fluid on the surfaces of the passages 89 will shift the valve rearwardly, thus completing the cycle of operations.

The modified form of valve mechanism illustrated in Figure 6 differs from that shown in Figure 5 in the respects that the supply chamber, designated 100 in the valve 101, is located in the outer surface of the valve and that the pressure fluid flows from supply to the chamber 100 through passages 102 located in a sleeve 103 constituting the outer bounding surface of the valve chamber 81. The plug 84 extends through the valve to assist in guiding it and is imperforate.

The passages in the valve, the arrangement of inlet passages, and the means serving as sealing surfaces for the passages 88 and 89, as well as the mode of operation of this form of valve may be, in all essential respects like those shown and described in connection with Figure 5.

We claim:

1. In a fluid actuated rock drill, the combination of a casing having a piston chamber and a piston therein, an exhaust port for the piston chamber, a valve chest having a valve chamber, inlet passages leading from the valve chamber to the piston chamber, a valve in the valve chamber having a plurality of passages through which pressure fluid flows from supply to the piston chamber and having their surfaces subjected to the suction of the pressure fluid for throwing the valve, and means for intermittently sealing the last mentioned passages.

2. In a fluid actuated rock drill, the combination of a casing having a piston chamber and a piston therein, an exhaust port for the piston chamber, a valve chamber in the casing, inlet passages leading from the valve chamber to the piston chamber, a valve in the valve chamber having a plurality of passages through which pressure fluid flows to the inlet passages and having their surfaces subjected to the suction of the pressure fluid for throwing the valve, opposed holding surfaces on the valve subjected to pressure fluid for holding the valve, and means for intermittently sealing the last mentioned passages.

3. In a fluid actuated rock drill, the combination of a casing having a piston chamber and a piston therein, an exhaust port for the piston chamber, a valve chamber in the casing, inlet passages leading from the valve chamber to the piston chamber, a valve in the valve chamber having a plurality of passages through which pressure fluid flows to the inlet passages and having their surfaces subjected to the suction of the pressure fluid for throwing the valve, opposed holding surfaces on the valve subjected to the pressure fluid flowing to the inlet passages for holding the valve, and means for sealing the outlet ends of the last mentioned passages.

4. In a fluid actuated rock drill, the combination of a casing having a piston chamber and a piston therein, an exhaust port for the piston chamber, a valve chamber in the casing, inlet passages leading from the valve chamber to the piston chamber, a guide member having a supply passage, a valve reciprocable on the guide member, passages in the valve through which pressure fluid flows from the supply passage to the inlet passages and having their surfaces subjected to the suction of the pressure fluid for throwing the valve, opposed holding surfaces on the valve subjected to pressure fluid for holding the valve, and means for intermittently sealing the last mentioned passages.

5. In a fluid actuated rock drill, the combination of a casing having a piston chamber and a piston therein, an exhaust port for the piston chamber, a valve chest having a valve chamber, inlet passages leading from the valve chamber to the piston chamber, a guide member within the valve having a supply passage terminating intermediate the ends of the valve chamber, a valve in the valve chamber having an internal recess constituting a supply chamber to receive pressure fluid from the supply passage, passages in the valve to conduct pressure fluid from the supply passage to the inlet passages and having large surfaces subjected to the suction of the pressure fluid for throwing the valve, and opposed holding surfaces on the valve subjected intermittently to pressure fluid for holding the valve.

6. In a fluid actuated rock drill, the combination of a casing having a piston chamber and a piston therein, an exhaust port for the piston chamber, a valve chest having a valve chamber, inlet passages leading from the valve chamber to the piston chamber, a supply passage terminating intermediate the ends of the valve chamber, an annular valve in the valve chamber, passages in the wall of the valve for conveying pressure fluid from the supply passage to the inlet passages and having their surfaces subjected to the suction of the pressure fluid for throwing the valve, and holding surfaces on the valve subjected intermittently to pressure fluid for holding the valve.

7. In a fluid actuated rock drill, the combination of a casing having a piston chamber and a piston therein, an exhaust port for the piston chamber, a valve chest having a valve chamber, inlet passages leading from the valve chamber to the piston chamber, an annular valve in the valve chamber having a supply chamber intermediate its ends, passages in the wall of the valve through which pressure fluid flows from the supply chamber to the inlet passages and having their surfaces subjected to the suction of the pressure fluid for throwing the valve, and holding surfaces on the valve subjected to pressure fluid for holding the valve.

8. In a fluid actuated rock drill, the combination of a casing having a piston chamber and a piston therein, an exhaust port for the piston chamber, a valve chest having a valve chamber, inlet passages leading from the valve chamber to the piston chamber, an annular valve in the valve chamber having a supply chamber intermediate its ends, passages in the wall of the valve through which pressure fluid flows from the supply chamber to the inlet passages and having their surfaces subjected to the suction of the pressure fluid for throwing the valve, and holding surfaces on the ends of the valve subjected to the pressure fluid flowing to the inlet passages for holding the valve.

9. In a fluid actuated rock drill, the combination of a casing having a piston chamber and a piston therein, an exhaust port for the piston chamber, a valve chest having a valve chamber, inlet passages leading from the valve chamber to the piston chamber, a supply passage having its outlet opening intermediate the ends of the valve chamber, a valve in the valve chamber, passages in the valve through which pressure fluid flows from the supply passage to the inlet passages and having their surfaces subjected to the suction of the pressure fluid for throwing the valve, opposed actuating surfaces on the valve intermittently subjected to pressure fluid to assist in throwing the valve, and holding surfaces on the valve subjected to pressure fluid for holding the valve.

10. In a fluid actuated rock drill, the combination of a casing having a piston chamber and a piston therein, an exhaust port for the piston chamber, a valve chest having a valve chamber, inlet passages leading from the valve chamber to the piston chamber, a supply passage having its outlet opening intermediate the ends of the valve chamber, a valve in the valve chamber, passages in the valve through which pressure fluid flows from the supply passage to the inlet passages and having their surfaces subjected to the suction of the pressure fluid for throwing the valve, opposed actuating surfaces on the valve, passages for supplying pressure fluid to the actuating surfaces to assist in throwing the valve and being controlled by the piston, and holding surfaces on the valve subjected to pressure fluid for holding the valve.

11. In a fluid actuated rock drill, the combination of a casing having a piston chamber and a piston therein, an exhaust port for the piston chamber, a valve chest having a valve chamber, inlet passages leading from the valve chamber to the piston chamber, a supply passage having its outlet opening intermediate the ends of the valve chamber, a valve in the valve chamber, passages in the valve through which pressure fluid flows from the supply passage to the inlet passages and having their surfaces subjected to the suction of the pressure fluid for throwing the valve, opposed actuating surfaces on the valve, passages for conveying pressure fluid from the piston chamber to the actuating surfaces to assist in throwing the valve and being controlled by the piston, and holding surfaces on the valve subjected to pressure fluid for holding the valve.

12. In a fluid actuated rock drill, the combination of a casing having a piston chamber and a piston therein, an exhaust port for the piston chamber, a valve chest having a valve chamber, a valve in the valve chamber, a supply chamber intermediate the ends of the valve, passages in the valve arranged in circular rows on opposite sides of the supply chamber and having their surfaces subjected to the suction of the pressure fluid for throwing the valve, an inlet passage for conveying pressure fluid from one row of passages to an end of the piston chamber, inlet passages arranged on opposite sides of the other row of passages for conveying pressure fluid to the other end of the piston chamber, and holding surfaces on the valve subjected to pressure fluid for holding the valve.

13. In a fluid actuated rock drill, the combination of a casing having a piston chamber and a piston therein, an exhaust port for the piston chamber, a valve chest having a valve chamber, a supply chamber intermediate the ends of the valve chamber, a valve in the valve chamber, front and rear groups of passages in the valve for conveying pressure fluid from the supply chamber and having their surfaces subjected to suction of the pressure fluid for throwing the valve, an inlet passage for conveying pressure fluid from one group of passages to an end of the piston chamber, inlet passages arranged in planes lying inside and outside of the plane of the other group of passages for conveying pressure fluid to the other end of the piston chamber, and holding surfaces on the valve subjected to pressure fluid for holding the valve.

14. In a fluid actuated rock drill, the combination of a casing having a piston chamber and a piston therein, an exhaust port for the piston chamber, a valve chest having a valve chamber, a valve in the valve chamber, a supply chamber intermediate the ends of the valve, passages in the valve arranged in circular rows on opposite sides of the supply chamber and having their surfaces subjected to the suction of the pressure fluid for throwing the valve, an inlet passage for conveying pressure fluid from one row of passages to an end of the piston chamber, concentrically arranged inlet passages lying on opposite sides of another row of passages in the valve for conveying pressure fluid to the other end of the piston chamber, and holding surfaces on the valve subjected to pressure fluid for holding the valve.

15. In a fluid actuated rock drill, the combination of a casing having a piston chamber and a piston therein, an exhaust port for the piston chamber, a valve chest having a valve chamber, a supply chamber intermediate the ends of the valve chamber, a valve in the valve chamber, passages in the valve arranged in circular rows on opposite sides of the supply chamber and presenting large areas of surface to the suction of the pressure fluid flowing therethrough for throwing the valve, seating surfaces for the valve forming closures for the outlet end of the passages, an inlet passage for conveying pressure fluid from one row of passages to an end of the piston chamber, inlet passages on opposite sides of a seating surface conveying pressure fluid from another row of passages into the other end of the piston chamber, and holding surfaces on the valve subjected to pressure fluid for holding the valve.

16. In a fluid actuated rock drill, the combination of a casing having a piston chamber and a piston therein, an exhaust port for the piston chamber, a valve chest having a valve chamber, a supply chamber intermediate the ends of the valve chamber, a valve in the valve chamber, passages in the valve arranged in circular rows on opposite sides of the supply chamber and presenting large areas of surface to the suction of the pressure fluid flowing therethrough for throwing the valve, seating surfaces for the valve forming closures for the outlet ends of the passages, an inlet passage for conveying pressure fluid from one row of passages to the front end of the piston chamber, inlet passages on opposite sides of a seating surface conveying pressure fluid from another row of passages into the rear end of the piston chamber, and holding surfaces on the valve subjected to pressure fluid for holding the valve.

17. In a fluid actuated rock drill, the combination of a casing having a piston chamber and a piston therein, an exhaust port for the piston chamber, a valve chest having a valve chamber, a valve in the valve chamber, a supply chamber intermediate the ends of the valve, passages in the valve arranged in circular rows on opposite sides of the supply chamber and having their surfaces subjected to the suction of the pressure fluid for throwing the valve, actuating surfaces on the valve intermittently subjected to pressure fluid to assist in throwing the valve, an inlet passage for conveying pressure fluid from one row of passages to an end of the piston chamber, inlet passages arranged on opposite sides of the other row of passages for conveying pressure fluid to the other end of the piston chamber, and holding surfaces on the valve subjected to pressure fluid for holding the valve.

18. In a fluid actuated rock drill, the combination of a casing having a piston chamber and a piston therein, an exhaust port for the piston chamber, a valve chest having a valve chamber, a valve in the valve chest having an external flange, supply chambers in the periphery of the valve, passages in the valve arranged in circular rows leading from the supply chambers to the ends of the valve and having their surfaces subjected to the suction of the pressure fluid for throwing the valve, an inlet passage for conveying pressure fluid from one end of the valve chamber to the front end of the piston chamber, inlet passages arranged concentrically with respect to each other and with respect to one circular row of passages for conveying pressure fluid into the rear end of the piston chamber, actuating surfaces on the flange intermittently subjected to pressure fluid for throwing the valve, and holding surfaces on the valve subjected to the pressure fluid flowing to the inlet passages for holding the valve.

19. In a fluid actuated rock drill, the combination of a cylinder having a piston chamber and a piston in the piston chamber, an exhaust port for the piston chamber, a valve chest having a valve chamber, front and rear inlet passages leading from the valve chamber to the piston chamber, a valve in the valve chamber having an internal supply chamber, passages in the valve for conveying pressure fluid from the supply chamber to the inlet passages and having their surfaces subjected to the suction of the pressure fluid for throwing the valve, and opposed holding surfaces intermittently subjected to pressure fluid for holding the valve.

20. In a fluid actuated rock drill, the combination of a cylinder having a piston chamber and a piston in the piston chamber, an exhaust port for the piston chamber, a valve chest having a valve chamber, front and rear inlet passages leading from the valve chamber to the piston chamber, a valve in the valve chamber having an internal supply chamber, passages in the valve for conveying pressure fluid from the supply chamber to the inlet passages and having their surfaces subjected to the suction of the pressure fluid for throwing the valve, actuating surfaces on the valve subjected intermittently to pressure fluid to assist in actuating the valve, and opposed holding surfaces intermittently subjected to pressure fluid for holding the valve.

21. In a fluid actuated rock drill, the combination of a casing having a piston chamber and a piston therein, an exhaust port for the piston chamber, a valve chest having a valve chamber, inlet passages leading from the valve chamber to the piston chamber, a valve in the valve chamber having a plurality of passages through which pressure fluid flows from supply to the piston chamber and having their surfaces subjected to the suction of the pressure fluid for throwing the valve, means for intermittently sealing the last mentioned passages, and opposed actuating surfaces on the valve intermittently subjected to pressure fluid to assist in throwing the valve.

22. In a fluid actuated rock drill, the combination of a casing having a piston chamber and a piston therein, an exhaust port for the piston chamber, a valve chest having a valve chamber, a valve in the valve chamber having a plurality of passages through which pressure fluid flows from supply to the piston chamber and having their surfaces subjected to the suction of the pressure fluid for throwing the valve, an inlet passage for conveying pressure fluid from the valve chamber to one end of the piston chamber, and inlet passages arranged on opposite sides of the first mentioned passages to convey pressure fluid to the other end of the piston chamber.

23. In a fluid actuated rock drill, the combination of a casing having a piston chamber and a piston therein, an exhaust port for the piston chamber, a valve chest having a valve chamber, a valve in the valve chamber having a plurality of passages through which pressure fluid flows from supply to the piston chamber and having their surfaces subjected to the suction of the pressure fluid for throwing the valve, an inlet passage for conveying pressure fluid from the valve chamber to one end of the piston chamber, inlet passages arranged on opposite sides of the first mentioned passages to convey pressure fluid to the other end of the piston chamber, and opposed actuating surfaces on the valve intermittently subjected to pressure fluid to assist in throwing the valve.

WILLIAM A. SMITH, Sr.
ALBERT R. MACK.